United States Patent
Wang et al.

(10) Patent No.: US 8,981,956 B2
(45) Date of Patent: Mar. 17, 2015

(54) INDICATION CONTROL CIRCUIT FOR INDICATING WORKLOAD OF ELECTRONIC DEVICE

(71) Applicant: Hon Hai Precision Industry Co., Ltd., New Taipei (TW)

(72) Inventors: Yi-Feng Wang, New Taipei (TW); Yu-Chia Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 2 days.

(21) Appl. No.: 13/941,559

(22) Filed: Jul. 15, 2013

(65) Prior Publication Data

US 2014/0077962 A1    Mar. 20, 2014

(30) Foreign Application Priority Data

Sep. 14, 2012  (TW) ............................. 101133802 A

(51) Int. Cl.
| | | |
|---|---|---|
| G08B 3/00 | (2006.01) | |
| G08B 5/36 | (2006.01) | |
| H05B 33/08 | (2006.01) | |
| G06F 11/32 | (2006.01) | |

(52) U.S. Cl.
CPC .............. *G08B 5/36* (2013.01); *H05B 33/0815* (2013.01); *G06F 11/325* (2013.01)
USPC .......................................... 340/691.8; 340/664

(58) Field of Classification Search
USPC .................................. 340/691.8, 664, 538.16
See application file for complete search history.

(56) References Cited

U.S. PATENT DOCUMENTS

| | | | |
|---|---|---|---|
| 4,496,939 A | 1/1985 | Moberg | |
| 7,902,992 B2 * | 3/2011 | Hunter | ........................... 340/664 |

FOREIGN PATENT DOCUMENTS

| | | |
|---|---|---|
| CN | 201242990 | 5/2009 |
| TW | 200700970 | 1/2007 |

* cited by examiner

*Primary Examiner* — Shirley Lu
(74) *Attorney, Agent, or Firm* — Novak Druce Connolly Bove + Quigg LLP

(57) ABSTRACT

A workload indicating control circuit includes a coupling circuit, a square wave signal producing circuit, and an integral circuit. The coupling circuit induces a current output by a power input circuit of an electronic device and produces a proportional induced voltage, the current output by the power input circuit being proportional to the workload of the electronic device. The square wave signal producing circuit converts the induced voltage from the coupling circuit into a square wave voltage with corresponding amplitude. The integral circuit takes the square wave signal and modulates the square wave voltage into a sawtooth voltage, to drive the light-emitting unit to emit light according to the sawtooth voltage.

18 Claims, 5 Drawing Sheets

INDICATION CONTROL CIRCUIT FOR INDICATING WORKLOAD OF ELECTRONIC DEVICE

BACKGROUND

1. Technical Field

The present disclosure relates to circuits, and particularly to workload indicators and an electronic device with the same.

2. Description of Related Art

Electronic devices such as smart phones and tablet computers are popular. Usually, the electronic device has a visible device such as a light-emitting diode (LED) to indicate some states of the electronic device. For example, when the power of a battery of the electronic device is nearly finished, the LED displays red light to alarm the user. However, the usual electronic device can not indicate the instant workload of the electronic device via the light-emitting unit.

A indication control circuit and an electronic device with the indication control circuit to overcome the described limitations are thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described with reference to the accompanying drawings.

Figure 1:
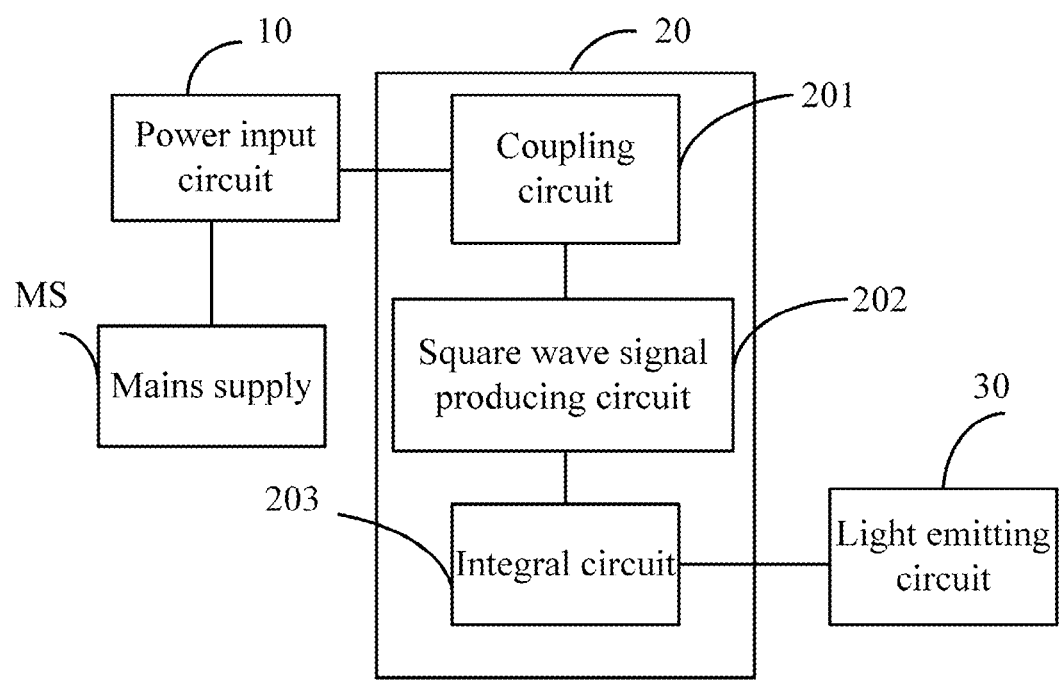
FIG. 1 is a block diagram of an electronic device with an indication control circuit, in accordance with an exemplary embodiment.
Figure 2:
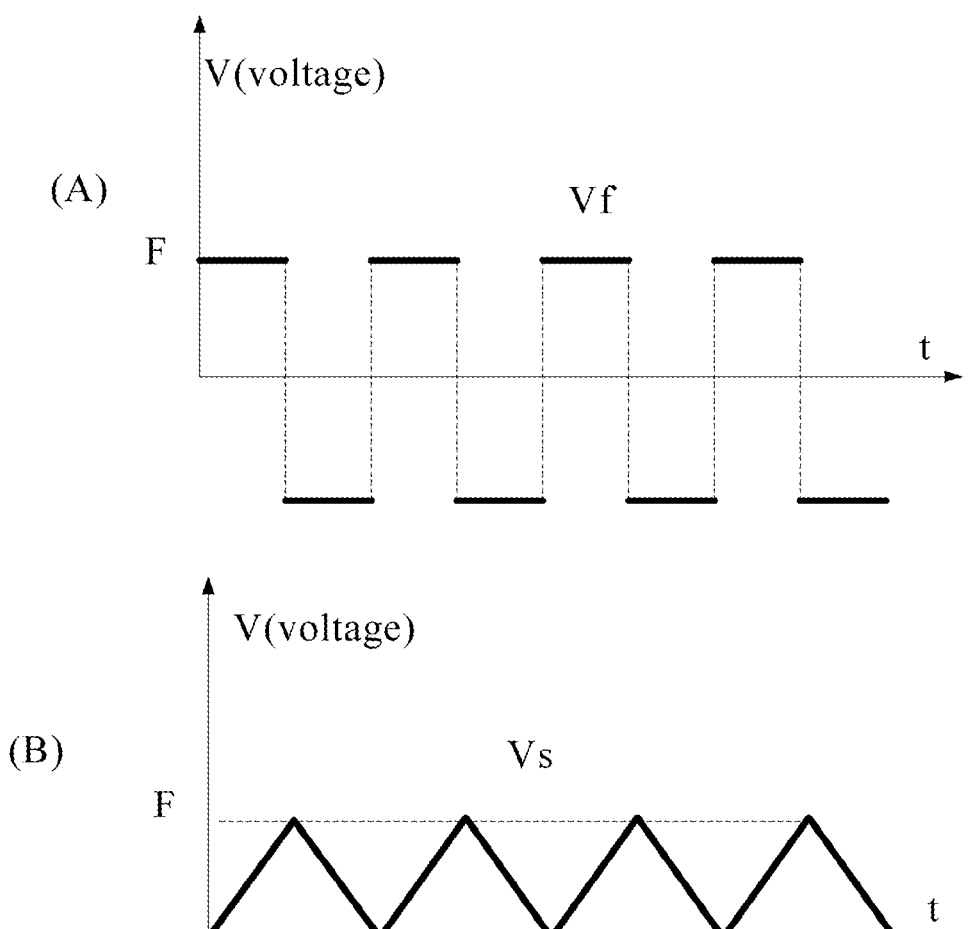
FIG. 2 is a schematic diagram illustrating a square wave voltage and a sawtooth voltage produced by an indication control circuit, in accordance with an exemplary embodiment.

Referring to FIGS. 1 and 2 together, an electronic device 100 with an indication control circuit 20 is illustrated. The electronic device 100 includes a power input circuit 10, the indication control circuit 20, and a light-emitting unit 30.

The power input circuit 10 receives mains supply (not shown) and converts an alternating current of the mains supply to direct current (DC) to power the electronic device 100. In the embodiment, the power input circuit 10 outputs a DC voltage and a sufficient current to power the electronic device 100. In detail, the power input circuit 10 provides power for the electronic elements of the electronic device 100, such as processor, networking components, storage, and the like. When a workload of the electronic device 100 becomes greater, that is, the electronic elements work harder or more electronic elements are used, the amount of current drawn from the power input circuit 10 becomes greater.

The light-emitting unit 30 emits light, and a brightness of the emitted light is proportional to a voltage and a current provided to the light-emitting unit 30.

The indication control circuit 20 includes a coupling circuit 201, a square wave signal producing circuit 202, and an integral circuit 203. The coupling circuit 201 is used to induce the current output by the power input circuit 10 and produce a corresponding induced voltage proportional to the amount of current output by the power input circuit 10.

The square wave signal producing circuit 202 is connected to the coupling circuit 201, and converts the induced voltage produced by the coupling circuit 201 to a square wave voltage Vf with a certain frequency. An amplitude of the square wave voltage Vf is proportional to the induced voltage.

The integral circuit 203 is connected between the square wave signal producing circuit 202 and the light-emitting unit 203. The integral circuit 203 modulates the square wave voltage to produce a sawtooth voltage Vs and power the light-emitting unit 203 by using the sawtooth voltage Vs.

In the embodiment, the square wave frequency or duty cycle is constant, and the maximum amplitude of the sawtooth voltage Vs is equal to the amplitude of the square wave voltage Vf. As is well known, a voltage of the sawtooth voltage changes from zero to the maximum amplitude and then descends from the maximum amplitude back to zero periodically, which causes the brightness of the light emitting unit 30 to change accordingly from dark to brightness and from brightness to dark periodically.

As described above, when the workload of the electronic device 100 increases, the current output by the power input circuit 10 also increases, and the induced voltage is proportional to the current output by the power input circuit 10, the amplitude of the square wave voltage Vf is thus proportional to the induced voltage. Thus, when the workload of the electronic device 100 becomes greater, the maximum amplitude of the sawtooth voltage Vs is also greater, the quanity of voltage variation in the sawtooth voltage Vs in unit time is also greater. Then a variation in brightness of the light emitting unit 203 in unit time also increases. Therefore, when the workload of the electronic device 100 is greater, the brightness of the light emitting unit 203 is changed more quicker, which warns the user that the workload of the electronic device 100 is heavier.

When the workload of the electronic device 100 is less, the maximum amplitude of the sawtooth voltage Vs is less, and a variation in voltage of the sawtooth voltage Vs in unit time is also less. Then the variation in brightness of the light emitting unit 203 in unit time is changed less. Therefore, when the workload of the electronic device 100 is less, the brightness of the light emitting unit 203 is changed slowly.

Figure 3:
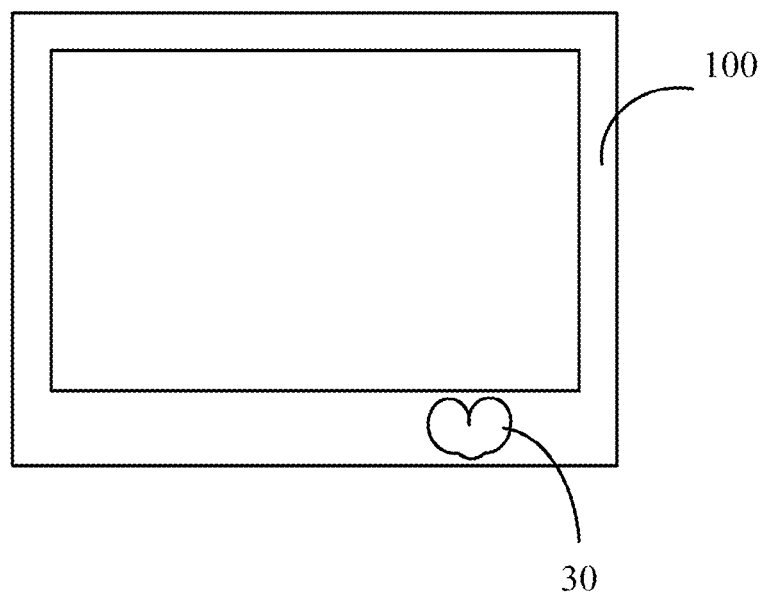
FIG. 3 is a schematic diagram of an electronic device with an indication control circuit, in accordance with an exemplary embodiment.

As shown in FIG. 3, in the embodiment, a shape of the light emitting unit 203 is heart-shaped. Obviously, the light emitting unit 203 can be set in any shape. In another embodiment, the light emitting unit 203 is used as a backlight of a half-transparent image and the half-transparent image is heart-shaped.

Figure 4:
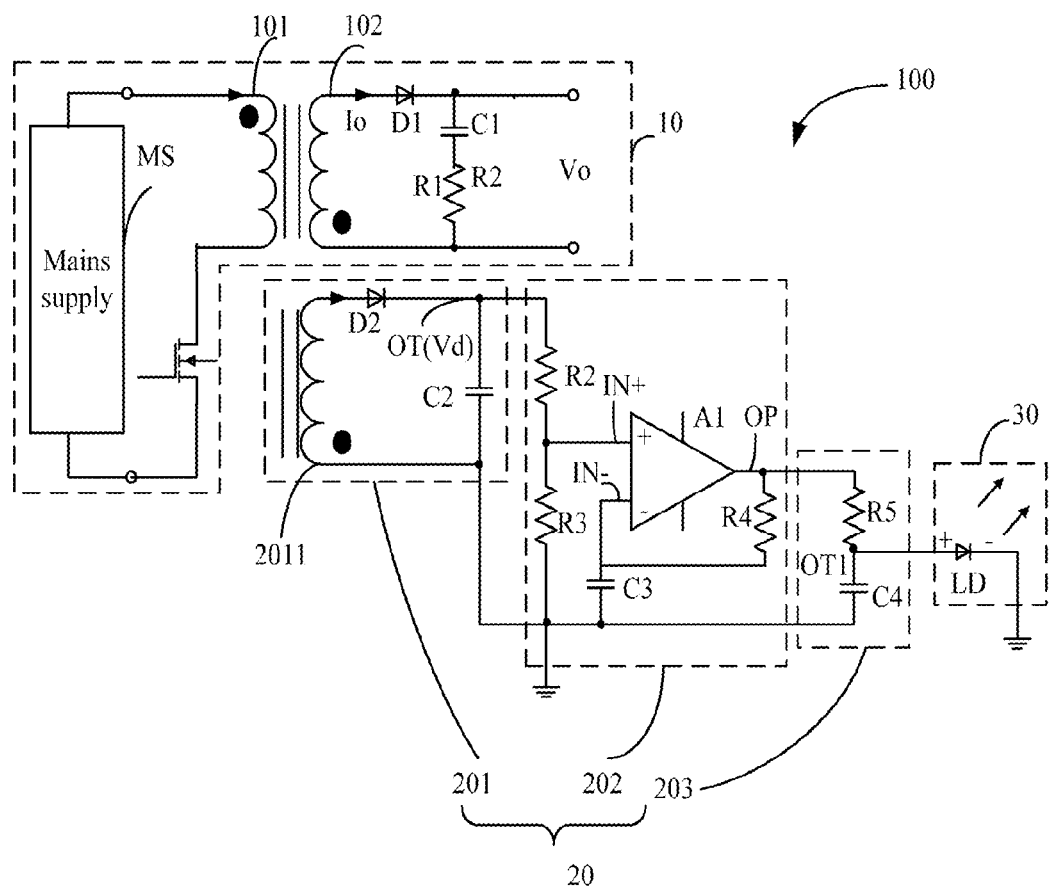
FIG. 4 is a circuit diagram of an electronic device with an indication control circuit, such as that of FIG. 1, in accordance with a first embodiment.

Referring also to FIG. 4, in the first embodiment, the power input circuit 10 includes a primary winding 101, a secondary winding 102, a rectifier diode D1, a rectifier capacitor C1, and a resistor R1. The primary winding 101 is connected to the mains supply MS. The primary winding 101 and the secondary winding 102 are combined to form a transformer and are used to convert the AC voltage of the mains supply MS to another AC voltage. In the embodiment, the primary winding 101 and the secondary winding 102 are used to convert the AC voltage of the mains supply MS to a smaller AC voltage.

The rectifier diode D1 and the rectifier capacitor C1 are combined to form a rectifier and filter circuit. The rectifier diode D1 and the rectifier capacitor C1 convert the AC voltage output by the secondary winding 102 to a DC voltage Vo and then provide the DC voltage Vo to the electronic device 100 to power the electronic device 100. In the embodiment, the DC voltage Vo is the DC voltage output by the power input circuit 10, a current Io flowing through the secondary winding 102 is the current output by the power input circuit 10. As described above, the current Io is proportional to the workload of the electronic device 100, when the workload of the electronic device 100 is heavier, the current Io is greater too, when the workload of the electronic device 100 is lighter, the current Io is also less.

In the embodiment, the coupling circuit 201 includes a coupling winding 2011, a diode D2, and a capacitor C2. The coupling winding 2011 is coupled to the secondary winding 102 of the power input circuit 10. As is well known, a ratio of respective currents flowing through the coupling winding 2011 and the secondary winding 102 depends on a turns ratio of the coupling winding 2011 and the secondary winding 102. Therefore, the ratio of the current flowing through the coupling winding 2011 and the current flowing through the secondary winding 102 is a constant value. Therefore, when the workload of the electronic device 100 is greater, the current flowing through the coupling winding 2011 is greater.

The diode D2 and the capacitor C2 are connected in series between the two ends of the coupling winding 2011. A connection node of the diode D2 and the capacitor C2 constitutes an output port OT of the coupling circuit 201. The diode D2 and the capacitor C2 are also combined to form a rectifier and filter circuit, the diode D2 and the capacitor C2 convert the current flowing through the coupling winding 2011 to the induced voltage Vd which is output via the output port OT.

The square wave signal producing circuit 202 includes an operational amplifier A1, resistors R2, R3, R4, and a capacitor C3. The resistors R2 and R3 are connected between the output port OT of the coupling circuit 201 and ground, and a connection node of the resistor R2 and R3 is connected to a non-inverting input port IN+ of the operational amplifier A1. The resistor R4 and the capacitor C3 are connected between an output port OP of the operational amplifier A1 and ground. A connection node of the resistor R4 and the capacitor C3 is connected to an inverting input port IN−. The square wave signal producing circuit 202 then converts the induced voltage Vd to the square wave voltage Vf according to the structure described above.

The integral circuit 203 includes a resistor R5 and a capacitor C4 which are connected between the output port OP of the operational amplifier A1 and ground. A connection node of the resistor R5 and the capacitor C4 constitutes an output port OT1 of the integral circuit 203 and is connected to an anode of the light emitting unit 30. The integral circuit 203 converts the square wave voltage Vf to the sawtooth voltage Vs accordingly.

Therefore, when the electronic device 100 is at work state, the coupling winding 2011 couples the secondary winding 102 and produces an induced current proportional to the current Io of the secondary winding 102. The diode D2 and the capacitor C2 rectify the induced current to produce the induced voltage Vd proportional to the induced current.

Assume a capacitance value of the capacitor C3 is jwC3, then it is easy to obtain the square wave voltage Vf output by the square wave signal producing circuit 202 shown in FIG. 2, where: Vf=Vd*R3(jwC*R4+1)/(R3+R2). The frequency of the square wave voltage Vf is $2\pi CR4$ and the amplitude of the square wave voltage Vf is proportional to the induced voltage Vd.

The integral circuit 203 modulates the square wave voltage Vf produced by the square wave signal producing circuit 202 and outputs the sawtooth voltage Vs as shown in FIG. 2. The maximum amplitude of the sawtooth voltage Vs is equal to the amplitude of the square wave Vf, and the frequency of the sawtooth voltage Vs is equal to the frequency of the square wave voltage Vf. As shown in FIG. 2, the voltage of the sawtooth voltage Vs changes from zero to the maximum amplitude and then from the maximum amplitude back to zero periodically.

In the embodiment, the light emitting unit 30 includes at least one light emitting diode (LED) LD. An anode of the LED LD is connected to the output port OT1 of the integral circuit 203, a cathode of the LED LD is grounded. As is well known, if a voltage of the anode of the LED LD is greater, the brightness of the light emitted by the LED LD is greater. Therefore, the brightness of the LED LD changes from dark to bright and from bright to dark in an alternating and periodic fashion.

As described above, when the workload of the electronic device is greater, the current Io flowing through the secondary winding 102 is greater, the induced voltage Vd output by the coupling circuit 2011 is greater, and the maximum amplitude of the sawtooth voltage Vs is greater, a voltage variation of the sawtooth voltage Vs in unit time is also thus greater. Then a variation in brightness of the light emitting unit 203 in unit time is greater. Therefore, when the workload of the electronic device 100 is heavier, the brightness of the light emitting unit 203 changes more quicker, which warns the user that the workload of the electronic device 100 is heavier.

Figure 5:
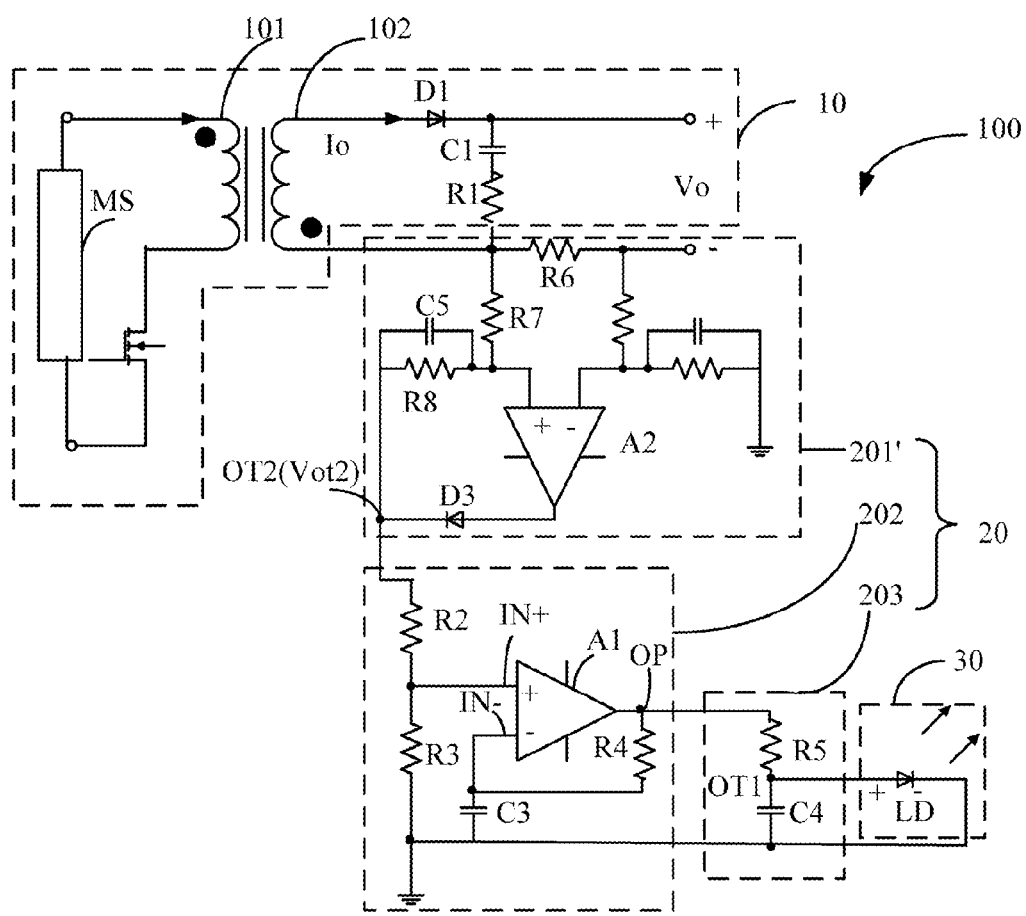
FIG. 5 is a circuit diagram of an electronic device with an indication control circuit, such as that of FIG. 1, in accordance with a second embodiment.

Referring also to FIG. 5, a circuit diagram of the electronic device 100 in a second embodiment is illustrated. Compared with the first embodiment, a coupling circuit 201' of the second embodiment is different from the coupling circuit 201 of the first embodiment, the other circuits are the same as in the first embodiment.

In the second embodiment, the coupling circuit 201' includes an operational amplifier A2 and resistors R6, R7, R8, a capacitor C5, a diode D3, and an output port OT2. The resistor R6 is located in a loop of the secondary winding 102 of the power input circuit 10, and detects the current Io flowing through the secondary winding 102.

The resistors R7 and R8 are connected between the output port OT2 and a terminal of the resistor R6 in series, thereby the terminal of the resistor R6 is closed to the secondary winding 102. A connection node of the resistors R7 and R8 is connected to a non-inverting input port (not labeled) of the operational amplifier A2. The capacitor C5 is connected between two ends of the resistor R8. The diode D3 is connected between an output port (not labeled) of the operational amplifier A2 and the output port OT2. An inverting input port (not labeled) of the operational amplifier A2 is grounded via a resistor (not labeled).

Assuming a voltage of the output port OT2 is Vot2, the voltage Vot2 is obtained by rectifying a voltage output by the output port of the operational amplfier through the diode D3 and the capacitor C5. Thus, Vot2=Io*R6*R8/R7. That is, the voltage of the output port OT2 is proportional to the current Io flowing through the secondary winding 102.

The square wave signal producing circuit 202 and the integral circuit 203 drive the light emitting unit 30 to emit light from dark to bright and then from bright to dark in an alternating fashion.

Thus, the light emitting unit 30 can be driven to change the brightness quickly or more slowly to indicate that the workload of the electronic device 100 is less.

The electronic device 10 can be a mobile phone, a digital photo frame, a digital camera, or a tablet computer.

The present embodiments and their advantages will be understood from the foregoing description, and various changes may be made thereto without departing from the spirit and scope of the disclosure or sacrificing all of its material advantages, the examples hereinbefore described merely being exemplary embodiments of the present disclosure.

What is claimed is:

1. An indication control circuit, configured to control a light emitting unit of an electronic device to emit light to indicate a workload of the electronic device, the indication control circuit comprising:
   a coupling circuit configured to induce a current output by a power input circuit of the electronic device and produce a corresponding induced voltage proportional to the current output by the power input circuit; wherein, the current output by the power input circuit is proportional to the workload of the electronic device;
   a square wave signal producing circuit connected to the coupling circuit, configured to convert the induced voltage produced by the coupling circuit to a square wave voltage, wherein, an amplitude of the square wave voltage is proportional to the induced voltage; and
   an integral circuit connected to the square wave signal producing circuit and the light emitting unit of the electronic device, configured to modulate the square wave voltage to produce a sawtooth voltage, and drive the light-emitting unit to emit light by using the sawtooth voltage.

2. The indication control circuit according to claim 1, wherein a maximum amplitude of the sawtooth voltage is equal to the amplitude of the square wave voltage, an voltage of the sawtooth voltage is changed from zero to the maximum amplitude and then changed from the maximum amplitude to zero periodically, which causes the brightness of the light emitting unit is changed from dark to bright and from bright to dark periodically too; when the workload of the electronic device becomes greater, the maximum amplitude of the sawtooth voltage becomes greater, a voltage variation of the sawtooth voltage in unit time becomes greater, and a variation in brightness of the light emitting unit in unit time is changed greater accordingly; when the workload of the electronic device becomes less, the maximum amplitude of the sawtooth voltage becomes less, the voltage variation of the sawtooth voltage in unit time becomes less, and the variation in brightness of the light emitting unit in unit time is changed less accordingly.

3. The indication control circuit according to claim 1, wherein the coupling circuit comprises a coupling winding, a first diode, and a first capacitor, the coupling winding is coupled to a secondary winding of the power input circuit, a ratio of the current flowing through the coupling winding and a current flowing through the secondary winding is a constant value; the first diode and the first capacitor are connected in series between two ends of the coupling winding, a connection node of the first diode and the first capacitor constitutes an output port of the coupling circuit; the first diode and the first capacitor convert the current flowing through the coupling winding to the induced voltage which is output via the output port of the coupling circuit.

4. The indication control circuit according to claim 3, wherein, the square wave signal producing circuit comprises an operational amplifier, a first resistor, a second resistor, a third resistor, and a second capacitor; the first resistor and the second resistor are connected between the output port of the coupling circuit and ground, and a connection node of the first resistor and the second resistor is connected to a non-inverting input port of the operational amplifier, the third resistor and the second capacitor are connected between an output port of the operational amplifier and the ground, a connection node of the third resistor and the second capacitor is connected to an inverting input port of the operational amplifier.

5. The indication control circuit according to claim 4, wherein the integral circuit comprises a fourth resistor and a third capacitor which are connected between the output port of the operational amplifier and the ground, a connection node of the fourth resistor and a third capacitor constitutes an output port of the integral circuit; wherein, the output port of the integral circuit is connected to an anode of the light emitting unit.

6. The indication control circuit according to claim 2, wherein the coupling circuit comprises a first operational amplifier, a fifth resistor, a sixth resistor, a seventh resistor, a fourth capacitor, a second diode, and an output port, the fifth resistor is located in a loop of a secondary winding of the power input circuit, and is configured to detect a current flowing through the secondary winding; the sixth resistor and the seventh resistor are connected between the output port of the coupling circuit and a terminal of the fifth resistor in series, wherein, the terminal of the fifth resistor is closed to the secondary winding; a connection node of the sixth resistor and the seventh resistor is connected to an non-inverting input port of the first operational amplifier; the fifth capacitor is connected between two ends of the seventh resistor, the second diode is connected between an output port of the first operational amplifier and the output port of the coupling circuit, an inverting input port of the first operational amplifier is grounded.

7. The indication control circuit according to claim 6, wherein, the square wave signal producing circuit comprises a second operational amplifier, a first resistor, a second resistor, a third resistor, and a second capacitor; the first resistor and the second resistor are connected between the output port of the coupling circuit and ground, and a connection node of the first resistor and the second resistor is connected to a non-inverting input port of the second operational amplifier, the third resistor and the second capacitor are connected between an output port of the second operational amplifier and the ground, a connection node of the third resistor and the second capacitor is connected to an inverting input port of the second operational amplifier.

8. The indication control circuit according to claim 7, wherein the integral circuit comprises a fourth resistor and a third capacitor which are connected between the output port of the second operational amplifier and the ground, a connection node of the fourth resistor and a third capacitor constitutes an output port of the integral circuit; wherein, the output port of the integral circuit is connected to an anode of the light emitting unit.

9. An electronic device comprising:
   a power input circuit comprising primary winding, a secondary winding, a rectifier diode, and a rectifier capacitor, wherein, the primary winding is connected to a mains supply, the primary winding and the secondary winding are combined to form a transformer to convert an AC voltage of the mains supply to a smaller AC voltage; the rectifier diode and the rectifier capacitor are combined to form a rectifier and filter circuit to convert the smaller AC voltage output by the secondary winding to a DC voltage, and then provide the DC voltage to the electronic device to power the electronic device;

a light emitting unit; and an indication control circuit comprising a coupling circuit, a square wave signal producing circuit, and an integral circuit; wherein, the coupling circuit is configured to induce a current output by a power input circuit of the electronic device and produce a corresponding induced voltage proportional to the current output by the power input circuit; wherein, the current output by the power input circuit is proportional to the workload of the electronic device; the square wave signal producing circuit is connected to the coupling circuit and is configured to convert the induced voltage produced by the coupling circuit to a square wave voltage, wherein, an amplitude of the square wave voltage is proportional to the induced voltage; the integral circuit is connected to the square wave signal producing circuit and the light emitting unit of the electronic device, and is configured to modulate the square wave voltage to produce a sawtooth voltage, and drive the light-emitting unit to emit light by using the sawtooth voltage.

10. The electronic device according to claim 9, wherein a maximum amplitude of the sawtooth voltage is equal to the amplitude of the square wave voltage, an voltage of the sawtooth voltage is changed from zero to the maximum amplitude and then changed from the maximum amplitude to zero periodically, which causes the brightness of the light emitting unit is changed from dark to bright and from bright to dark periodically too; when the workload of the electronic device becomes greater, the maximum amplitude of the sawtooth voltage becomes greater, a voltage variation of the sawtooth voltage in unit time becomes greater, and a variation in brightness of the light emitting unit in unit time is changed greater accordingly; when the workload of the electronic device becomes less, the maximum amplitude of the sawtooth voltage is less, the voltage variation of the sawtooth voltage in unit time becomes less, and the variation in brightness of the light emitting unit in unit time is changed less accordingly.

11. The electronic device according to claim 9, wherein the coupling circuit comprises a coupling winding, a first diode, and a first capacitor, the coupling winding is coupled to a secondary winding of the power input circuit, a ratio of the current flowing through the coupling winding and a current flowing through the secondary winding is a constant value; the first diode and the first capacitor are connected in series between two ends of the coupling winding, a connection node of the first diode and the first capacitor constitutes an output port of the coupling circuit; the first diode and the first capacitor convert the current flowing through the coupling winding to the induced voltage which is output via the output port of the coupling circuit.

12. The electronic device according to claim 11, wherein, the square wave signal producing circuit comprises an operational amplifier, a first resistor, a second resistor, a third resistor, and a second capacitor; the first resistor and the second resistor are connected between the output port of the coupling circuit and ground, and a connection node of the first resistor and the second resistor is connected to a non-inverting input port of the operational amplifier, the third resistor and the second capacitor are connected between an output port of the operational amplifier and the ground, a connection node of the third resistor and the second capacitor is connected to an inverting input port of the operational amplifier.

13. The electronic device according to claim 12, wherein the integral circuit comprises a fourth resistor and a third capacitor which are connected between the output port of the operational amplifier and the ground, a connection node of the fourth resistor and a third capacitor constitutes an output port of the integral circuit; wherein, the output port of the integral circuit is connected to an anode of the light emitting unit.

14. The electronic device according to claim 10, wherein the coupling circuit comprises a first operational amplifier, a fifth resistor, a sixth resistor, a seventh resistor, a fourth capacitor, a second diode, and an output port, the fifth resistor is located in a loop of a secondary winding of the power input circuit, and is configured to detect a current flowing through the secondary winding; the sixth resistor and the seventh resistor are connected between the output port of the coupling circuit and a terminal of the fifth resistor in series, wherein the terminal of the fifth resistor is closed to the secondary winding; a connection node of the sixth resistor and the seventh resistor is connected to an non-inverting input port of the first operational amplifier; the fifth capacitor is connected between two ends of the seventh resistor, the second diode is connected between an output port of the first operational amplifier and the output port of the coupling circuit, an inverting input port of the first operational amplifier is grounded.

15. The electronic device according to claim 14, wherein, the square wave signal producing circuit comprises a second operational amplifier, a first resistor, a second resistor, a third resistor, and a second capacitor; the first resistor and the second resistor are connected between the output port of the coupling circuit and ground, and a connection node of the first resistor and the second resistor is connected to a non-inverting input port of the second operational amplifier, the third resistor and the second capacitor are connected between an output port of the second operational amplifier and the ground, a connection node of the third resistor and the second capacitor is connected to an inverting input port of the second operational amplifier.

16. The electronic device according to claim 15, wherein the integral circuit comprises a fourth resistor and a third capacitor which are connected between the output port of the second operational amplifier and the ground, a connection node of the fourth resistor and a third capacitor constitutes an output port of the integral circuit; wherein, the output port of the integral circuit is connected to an anode of the light emitting unit.

17. The electronic device according to claim 9, wherein, the light emitting unit comprises at least one light emitting diode.

18. The electronic device according to claim 9, wherein, the electronic device is a mobile phone, a tablet computer, a digital photo frame, or a digital camera.

* * * * *